Feb. 9, 1943. G. A. RUBISSOW 2,310,551
THROTTLE ACTUATING DEVICE
Filed Jan. 17, 1940 3 Sheets-Sheet 1
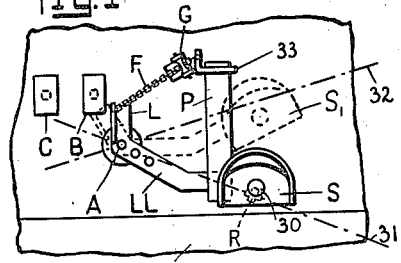
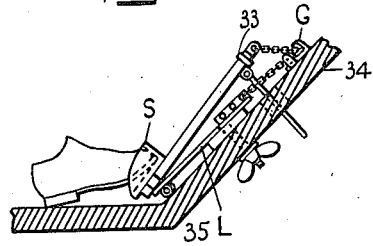
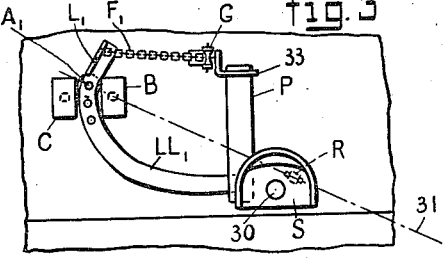
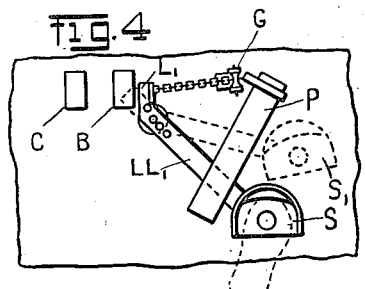
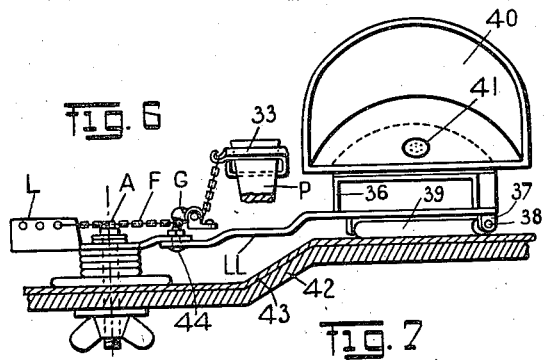
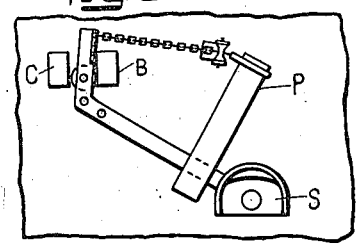
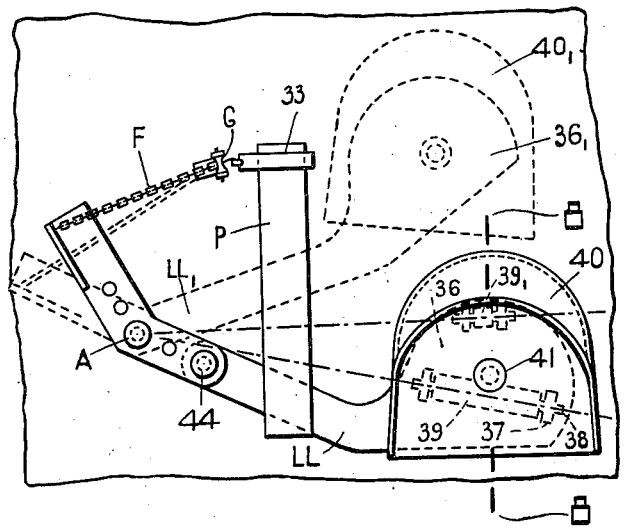
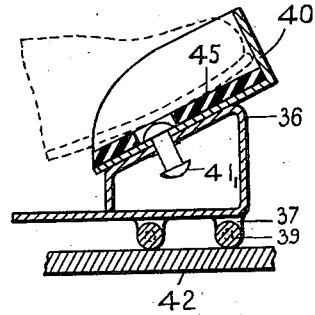
INVENTOR.
George A. Rubissow.

Feb. 9, 1943.  G. A. RUBISSOW  2,310,551
THROTTLE ACTUATING DEVICE
Filed Jan. 17, 1940   3 Sheets-Sheet 2
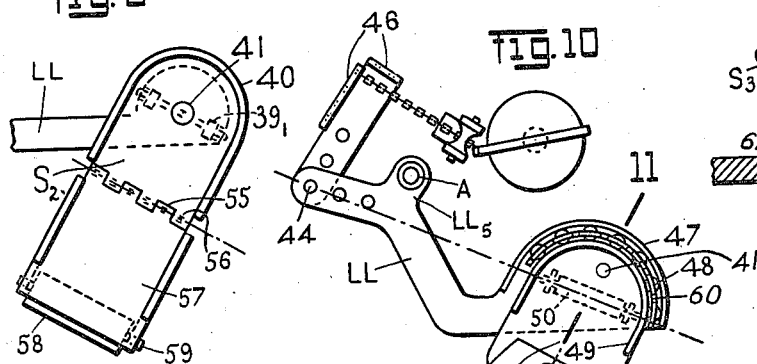
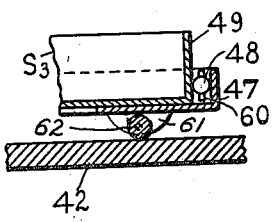
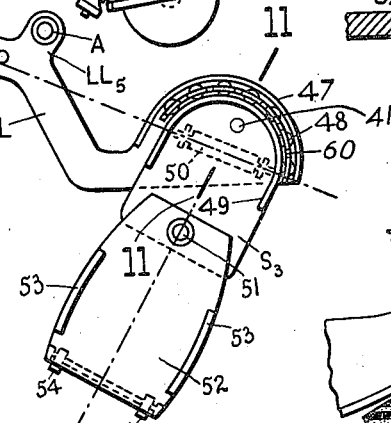
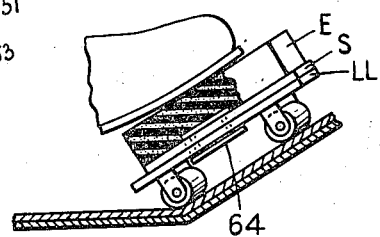
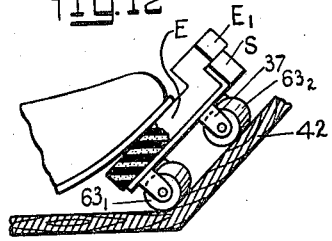
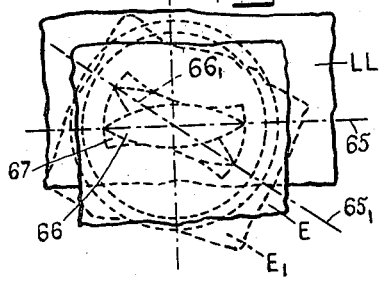
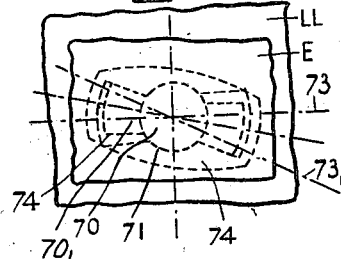
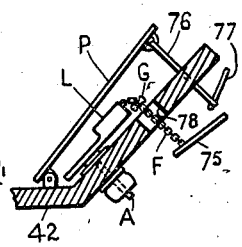
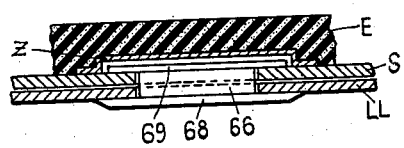
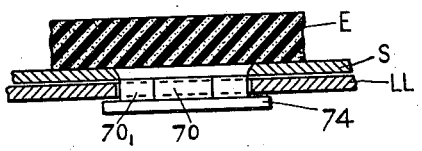
INVENTOR.
George A. Rubissow.

Feb. 9, 1943.        G. A. RUBISSOW        2,310,551
THROTTLE ACTUATING DEVICE
Filed Jan. 17, 1940        3 Sheets-Sheet 3
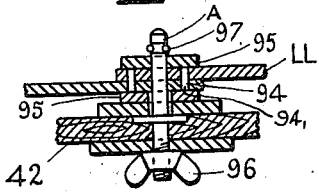
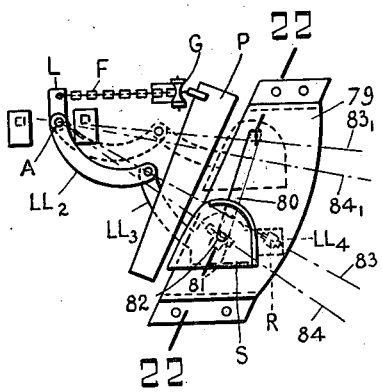
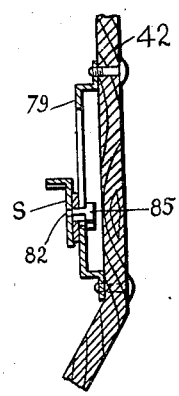
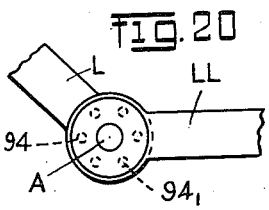
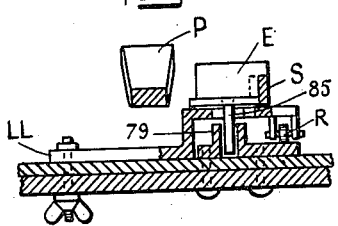
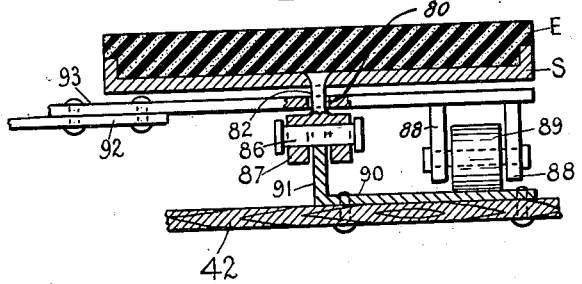
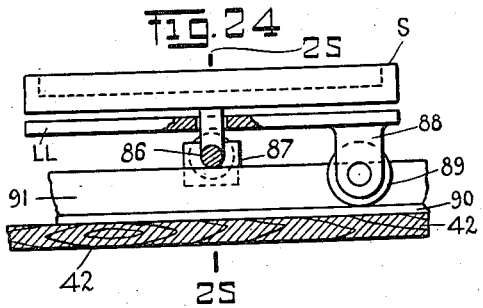
INVENTOR.
George A. Rubissow.

Patented Feb. 9, 1943

2,310,551

UNITED STATES PATENT OFFICE 2,310,551

THROTTLE ACTUATING DEVICE

George A. Rubissow, New York, N. Y.

Application January 17, 1940, Serial No. 314,224

9 Claims. (Cl. 74—513)

This application is a continuation in part of my application, U. S. Serial No. 160,425, filed August 23, 1937, for Throttle actuating device.

Accelerator devices that are actuated by a foot-pedal, as used today, are a source of fatigue because they require continuous pressure which can only be maintained by constant physical exertion, especially of the muscles and nerves of the foot. Fatigue caused in this way and continued over a long period of time can injure the health of the driver and cause a lowering of his morale, particularly in cases where many hours of daily driving are required.

An attempt to eliminate these inconveniences have been made time and again, but as yet, no device has been invented which does away with all strain on the foot muscles and nerves.

It is the object of this invention to provide such a device. The herein described device may be put in place within a few minutes by means of a simple attachment. It may be adapted to the existing pedal, if desired, so that in the event that the driver wishes to continue using the pedal that is already in his car, when driving for instance in the city through a great deal of traffic, he may use both the existing pedal and the device covered by this application.

This invention is an improvement on previous patent applications, Serial Nos. 152,383, 160,425, 230,415, 270,177, 279,896, 304,504, and 270,176.

The novel features of this invention will more fully appear from the following description when the same is read in connection with the accompanying drawings and the appended claims. It is to be expressly understood, however, that the drawings are for purposes of schematical illustration only and are not intended as a definition as to the design or the limits of the several aspects of this invention.

In the drawings wherein like reference characters refer to like parts through the several views:

Figure 1 is a schematical top plan-view of the floor of a car with device mounted thereon.

Figure 2 is a side-view partly in cross-section of Figure 1.

Figure 3 is a schematical top plan-view of the floor of a car with device mounted thereon.

Figures 4 and 5 are schematical plan-views of the device mounted on the floor.

Figure 6 is a side-view partly in cross-section of the device mounted on the floor.

Figure 7 is a top plan-view of Figure 6.

Figure 8 is a side-view in cross-section with parts broken out of Figure 7.

Figure 9 is a top plan-view of the shoe-support.

Figure 10 is a top plan-view of another aspect of the device.

Figure 11 is an enlarged side-view in cross-section of Figure 10 with parts broken out.

Figures 12 and 13 are side-views partly in cross-section of another aspect of the shoe-support.

Figure 14 is a top plan-view of a pivot arrangement employed between the shoe-support and the lever with parts broken out.

Figure 15 is a cross-sectional view of Figure 14.

Figure 16 is a top plan-view of another aspect of the pivot arrangement employed between the shoe-support and the lever with parts broken out.

Figure 17 is a cross-sectional view of Figure 16.

Figure 18 is a side-view partly in cross-section of a lever device mounted on the floor independent of the accelerator pedal.

Figure 19 is a cross-sectional view of a fixation axle.

Figure 20 is a top plan-view of Figure 19.

Figure 21 is a top plan-view of another aspect of the device.

Figure 22 is a cross-sectional view 22—22 of Figure 21.

Figure 23 is a cross-sectional side-view with parts broken out of Figure 21, following the axis 34.

Figure 24 is a side-view partly in cross-section of a shoe support.

Figure 25 is a cross-sectional side-view of a shoe-support.

Figures 1 and 2 show one aspect of the invention mounted on the floor 34 of a vehicle. The device consists of a rigid lever LL—L mounted on the axle A, said axle being rigidly mounted on the floor. The arm LL of the lever is longer than the other arm L. The axle A is mounted between the arms L and LL. Several holes may be provided in the arms for the axle, using the appropriate hole for adjusting the desired relationship between the arms of the lever. Both arms form one rigid lever.

If desired, the axle A may be mounted on the free end of the arm L (not shown in the drawings) in which case the flexible connection F must be affixed somewhere along the first third of the length of the lever LL—L, being the part adjacent to the said axis (not shown in the drawings).

The arm L of the lever LL—L is provided with attachment means for the flexible connection F, which passes through the guide means G. These means may be a pulley, a guide, or a roller mounted rigidly on the floor, and preferably as close as possible to the pedal, attached by suitable fixation means 33 to the accelerator pedal P. The accelerator pedal used in modern cars, has a general aspect in common with that shown in Figures 1 and 2. The arm LL passes under the pedal P through the free space formed between the said pedal P and the floor. On the free end of this arm LL or near it, is affixed the shoe-support S. The arm LL may also, if desired, pass over the pedal P or around it. The left side of the shoe-support S, as shown in Figures 1 and 2, overlaps (preferably slightly) the right side of the accelerator pedal, being then substantially at the same level as the adjacent overlapped area of the pedal. When the driver places his foot on the shoe-support S, the foot is in close proximity to the pedal, enabling him to use one or the other means at any time, to actuate the throttle; i. e., he can put his foot either on the old, already existing accelerator pedal and press it downwards, or put his foot on the shoe-support S and push it to and fro. The length of the arm LL in relation to the other arm L, should be such that when the driver places his shoe on the shoe-support S, the friction engagement of the part of his shoe which rests on the floor will be sufficient to at least counterbalance the reaction of the throttle which is transmitted to the shoe-support S through the lever LL—L and through the flexible connection F from the accelerator system.

In the average case, the relationship of the length of the arm L:LL may be equal to 1:2, and may go as high as 1:6 or 1:7. The average passenger car shows very satisfactory results with 1:4. Trucks, buses, heavy vehicles and other engines, locomotives, tramways, etc., which also have pedals provided for controlling speed, regardless of whether they use carburetor, steam or electric power, generally require the relationship of 1:5, to 1:10. These figures, however, do not limit this invention thereto.

The lever LL—L may be mounted in the axle A as shown in Figure 1. In this case the axle A is placed in the proximity of the pedal B, the average brake pedal of a car. An arrangement such as this permits the use of a relatively small lever LL—L. However, it may sometimes be found desirable to lengthen the arm LL of the lever to $LL_1$, and the arm L to $L_1$. The axis of rotation will then be in $A_1$ and may be placed between the clutch pedal C and the brake pedal B or in any other suitable place in the vicinity of the accelerator pedal, as shown in Figures 3 and 5.

The lever arm LL after passing under the pedal P rises, whereat the shoe-support S, affixed by fixation or pivot means 30 to LL, is at the required level. When the shoe-support S is moved to and fro by the foot, the shoe-support is displaced substantially parallel to the floor. The accelerator pedal P is pressed down in proportion to the movement of the shoe support S, whereby the level of the shoe-support in respect to the floor and to the overlapping area of the accelerator pedal, remains substantially the same. The lever-arm LL should preferably be provided with at least one roller R under the shoe-support S. It is advisable to place the axis of the said roller so that it coincides with axis 31 which passes through the axis of the axle of rotation A and the axis of the roller R. Should the lever LL—L be moved from its position 31 to the position 32, the roller will continue to roll in the direction of the tangent in relation to the circle made by the movement of LL around A. If no roller is employed, the floor should have a smooth surface so that the arm of the lever may slide thereon. In order to maintain the flexible connection in the desired position when in operation, a plurality of rollers, pulleys or guide-means may be employed, placed on the path of the flexible connection, instead of a single roller.

As shown in Figures 1, 2 and 3, the shoe-support S is rigidly affixed to LL. However, Figures 6, 7 and 8 show the shoe-support affixed pivotally by fixation means 41. If desired, the shoe-support may be mounted with sufficient looseness, as shown in Figure 8, $41_1$, and if found necessary, a rubber layer 45 may be mounted thereon with an opening to fit the head of $41_1$. A pivotal mounting such as this provides a comfortable position for the foot during the to and fro sliding, inasmuch as the foot is thus not forced to follow the tangent. The roller 39 mounted on the axle 38 affixed by means of support 37 to arm LL permits very facile movement of the lever LL—L even in the case where the floor 42 is covered with rubber 43. Instead of one roller R of a substantial axial length, a plurality of smaller rollers may be used on the same axle. More than one axle may also be employed, as shown, for instance, in Figures 12 and 13.

If two axles are employed, as shown in Figure 12, the axes of these axles may be parallel to each other, one of them following the radius 31 of Figure 1, or both may follow a similar radius of rotation thereby providing a minimum amount of friction between the rollers $63_1$ and $63_2$ and the floor.

The lever LL—L may have a curved or straight form and be provided with adjustable locking means as shown in Figures 6 and 7, 44.

Still another aspect of the invention consists in the form of the shoe-support S, the front edge of which may be elevated to form an arresting edge 40 as shown in Figures 6, 7 and 8.

Another aspect consists in providing a pivotal shoe-support S as shown in Figure 9 provided with rising flanges 40, said shoe-support being mounted pivotally on an axle 41. The lever-arm LL is provided with rollers $39_1$. The shoe-support is further provided with an articulating axle 56, on which a shoe-support 57 is mounted pivotally by articulating means. This support 57 is provided with a roller 58 mounted on an axle 59.

Figure 10 shows still another aspect of a shoe-support wherein the member $S_3$ is attached loosely to the arm-lever LL by an axle similar to $41_1$ in Figure 8, with sufficient clearance to permit its pivotal play. Arm LL of the lever has a semi-circular flange 47. Between the said flange and the shoe-support $S_3$, a number of roll-bearings or cylinder-bearings 48, mounted on a support 60, may be provided. The roller 50 is affixed to the arm LL. The shoe-support $S_3$ is further provided with a pivot 51 on which a support 52 is mounted, said shoe-support having arresting means 53 and rollers 54. If desired, two or more rollers 62, instead of one roller 50, mounted on support 61 may be employed, as shown in Figure 11.

Still another and very important embodiment of this invention consists in providing a shoe-support S with a rubber-sponge layer E (similar material may be also employed), as shown in Figures 12 and 13. This layer E must be firmly affixed to the shoe-support and be of sufficient thickness to permit the driver to rest his shoe thereon, with only slight pressure. This will provide the necessary frictional resistance between the shoe and the layer E. For this purpose, the layer E may be provided with a slight flange E₁ as shown in Figure 12.

Another aspect consists in providing a pivotal axle between the shoe-support S and the lever-arm LL, so that pivotal action thereof will be limited as required. This can easily be arranged, as shown in Figure 14, wherein the axle 66 is shaped like an almond and is rigidly affixed to arm LL by means of a member 68. The shoe-support S is provided with an opening 67, the width of which in the center is substantially the same as the width of the almond-shaped member, the length, greater, to enable the almond-shaped member to limitedly pivot therein. This is shown in Figure 14 wherein the axis 65 of the almond-shaped axle moves to position 65₁. The shoe-support S if provided with a layer E must also have a protective layer Z to prevent the upper part of the almond-shaped member 69 from contacting the rubber-sponge layer.

Another aspect, similar to arrangement as depicted on Figure 14 and Figure 15, consists in a pivotal axle 70, Figures 16 and 17, limited in its movements and having a circular center mounted in a circular opening 71, which is mounted in the arm of the lever. This opening serves as a bearing for the pivotal axle 70. The axle should have an arm-member 70₁ to prevent rotation. When axle 70 rotates from the position 73 to 73₁ remains concentric to the opening 71.

As shown on Figure 17, axle 70 may be rigidly affixed to the shoe support S and may be further provided with a member 74.

Still another aspect of this invention is shown in Figures 21, 22, 23, and 25 wherein the arm LL of the lever LL—L is composed of parts LL₂, LL₃, LL₄, each rigidly affixed to the other. The arm L may be mounted on the member LL₃ or LL₄. The free end of LL₄ may be provided with a roller R, the axis of which roller is placed on the axis 83. The opening 81 is placed on the axis 84. The direction of axis 83 is determined by passing through the axis of the axle A, and through the axis of the roller R. The direction of axis 84 is determined by passing through the axis of the axle A and the axis of the axle 82 of the shoe-support.

The opening 81 in the shoe-support S, Figure 21, should be of a length that will permit it, during all the movements of the lever from its position 83 to 83₁, to register another opening 80 provided along the support 79 mounted rigidly on the floor, as shown in Figures 21, 22 and 23. An axle 82, one side of which is mounted on the shoe-support S, passes simultaneously through openings 81 and 80, thereby establishing operative interconnections between the shoe-support and the openings.

Axle 82 may have an enlargement 85, as shown in Figures 22 and 23, in order to prevent the rotation of S, and permit the shoe-support to remain always parallel to the accelerator pedal P, if this be desired, or to follow continuously a predetermined area of displacement prescribed by the opening 80, which may be straight or curved. The drawings show the opening as a straight line. The roller R mounted on member LL₄ during its movement around axle A, follows a part of the circumference from 83 to 83₁. It may therefore be advisable to enlarge the support 79 in order to form a shoulder for the roller R on which it can roll.

Opening 80 may be elevated in relation to the floor, as shown in Figure 22.

Instead of opening 80, the same effect may be achieved by providing an edge 91, Figures 24 and 25, on which a roller 86 is mounted on a support 87. The roller contacts the edge 91, and the support 87 is rigidly connected through the axle 82 with shoe-support S. Axle 82 is guided in the opening 80. The lever arm LL is further provided with roller 89 mounted on supports 88.

Still another aspect of this invention provides means to adjust the length of the lever-arm LL, so that it will fit on all types of cars. For this purpose, it is composed of two strips of material, one part of one end 92 overlapping the other part of another end 93, as shown in Figure 25. Fixation means of any nature (screws, bolts, clips, etc., may be provided to attach both ends to each other at a predetermined place.

Another aspect of this invention consists in adapting the device so that it can be applied separately, and independent of the operator's pedal, as shown in Figure 18. The flexible connection F passes through opening 78 in the floor 42. It then passes below the floor and is affixed to a lever 75 of the accelerator system. This device operates in the same manner as the device described in Figures 1, 5 and 7. If desired, the flexible connection F may pass through the opening in the floor through which the rod 76 connects the pedal P and the lever 77 of the accelerator system.

Figures 19 and 20 show an adjustable locking member mounted between the arms L and LL of the lever LL—L, to permit adjustment of the angle between the arms. The arms of the lever may be provided with a plurality of openings 94 in which small cylinders 94₁ are placed. Washers 95 may be affixed on both sides of L and LL, and maintained in their position by locking means 97 affixed on axle A.

If desired, this arrangement may be employed as a new accelerator device and the old accelerator pedal entirely eliminated, as shown in Figure 18.

Having now particularly described and ascertained the nature of my said invention and in what manner the same is to be performed, I declare that what I claim is:

1. A device for actuating the accelerator pedal mounted on the floor of a motor vehicle, comprising a lever pivotally mounted upon an axle substantially perpendicular to the said floor, a flexible connection, one end of which is connected with the said accelerator pedal, the other end of which is connected with an appropriate part of one end of the said lever, said flexible connection passing through at least one guide-means rigidly affixed in respect to the said floor in the proximity of the said pedal, the other end of the said lever being provided with a shoe-support member pivotally mounted thereon, whereby when the foot of the driver contacts the said shoe-support member and moves it to and fro, the said lever automatically pivots substantially parallel to the floor and automatically actuates the said accelerator pedal through the intermediary of the said flexible connection.

2. A device for actuating the accelerator pedal mounted no the floor of a motor vehicle, comprising a lever pivotally mounted upon an axle substantially perpendicular to the said floor, a flexible connection, one end of which is connected with the said accelerator pedal, the other end of which is connected with an appropriate part of one end of the said lever, said flexible connection passing through at least one guide-means rigidly affixed in respect to the said floor in the proximity of the said pedal, the other end of the said lever provided with a shoe-support member attached by means of a pivotal axle mounted substantially perpendicular to the said other end of the said lever, a part of the said shoe-support member at least partly overlapping the said common accelerator pedal, whereby when the foot of the driver contacts the said shoe-support member and moves it to and fro, the said lever automatically pivots substantially parallel to the floor and automatically actuates the said accelerator pedal through the intermediary of the said flexible connection.

3. A device for actuating the accelerator pedal mounted on the floor of a motor vehicle, comprising a lever pivotally mounted upon an axle substantially perpendicular to the said floor, a flexible connection, one end of which is connected with the said accelerator pedal, the other end of which is connected with an appropriate part of one end of the said lever, said flexible connection passing through at least one guide-means rigidly affixed in respect to the said floor in the proximity of the said pedal, the other end of the said lever provided with a shoe-support member attached by means of a pivotal axle mounted substantially perpendicular, to the said other end of the said lever, a part of the said shoe-support member at least partly overlapping the said common accelerator pedal, said other part of the said lever provided with at least one roller capable of rolling on the said floor when the said lever is moved to and fro, whereby when the foot of the driver contacts the said shoe-support member and moves it to and fro, the said lever automatically pivots substantially parallel to the floor and automatically actuates the said accelerator pedal through the intermediary of the said flexible connection.

4. A device for actuating the accelerator pedal mounted on the floor of a motor vehicle, comprising a lever pivotally mounted upon an axle substantially perpendicular to the said floor, a flexible connection, one end of which is connected with the said accelerator pedal, the other end of which is connected with an appropriate part of one end of the said lever, said flexible connection passing through at least one guide-means rigidly affixed in respect to the said floor in the proximity of the said pedal, the other end of the said lever being provided with a shoe-support member pivotally mounted thereon, the said shoe-support member being provided with arresting means for the shoe of the driver.

5. A device for actuating the accelerator pedal mounted on the floor of a motor vehicle, comprising a lever pivotally mounted upon an axle substantially perpendicular to the said floor, a flexible connection, one end of which is connected with the said accelerator pedal, the other end of which is connected with an appropriate part of one end of the said lever, said flexible connection passing through at least one guide-means rigidly affixed in respect to the said floor in the proximity of the said pedal, a part of the said other end of the said lever being provided with at least one roller able to roll on the said floor when the said lever is slid to and fro, and also provided with a shoe-support member attached by means of a pivot-axle mounted substantially perpendicular in respect to the said part of the said other end of the said lever, said shoe-support member being provided on its upper surface with an elastic, preferably sponge-like rubber layer.

6. A device for actuating the accelerator pedal mounted on the floor of a motor vehicle, comprising a lever pivotally mounted upon an axle substantially perpendicular to the said floor, a flexible connection, one end of which is connected with the said accelerator pedal, the other end of which is connected with an appropriate part of one end of the said lever, said flexible connection passing through at least one guide-means rigidly affixed in respect to the said floor in the proximity of the said pedal, a suitable part of the said other end of the said lever being provided with a shoe-supporting member mounted pivotally on the said lever and provided with at least one roller capable of rolling on the said floor when the said lever is slid to and fro, said roller being mounted on a shaft, the axis of which is coincident to the radius of rotation of the said lever, said radius passing through the said axle and the said axis of the said shaft.

7. A device for actuating the accelerator pedal mounted on the floor of a motor vehicle, comprising a lever pivotally mounted upon an axle substantially perpendicular to the said floor, a flexible connection, one end of which is connected with the said accelerator pedal, the other end of which is connected with an appropriate part of one end of the said lever, said flexible connection passing through at least one guide-means rigidly affixed in respect to the said floor in the proximity of the said pedal, the other end of the said lever being provided with a shoe-support member pivotally mounted through the intermediary of a pivot member capable of pivoting limitedly in predetermined guide-ways.

8. A device for actuating the accelerator pedal mounted on the floor of a motor vehicle, comprising a lever pivotally mounted upon an axle substantially perpendicular to the said floor, a flexible connection, one end of which is connected with the said eccelerator pedal, the other end of which is connected with an appropriate part of one end of the said lever, said flexible connection passing through at least one guide-means rigidly affixed in respect to the said floor in the proximity of the said pedal, the other end of the said lever being provided with a shoe-support member pivotally mounted on a part of the said other end of the said lever, said lever being composed of at least two articulated parts, interconnected by means of an adjustable locking means provided therefor.

9. A device mounted on the floor of a motor vehicle for actuating the accelerator system of said vehicle, comprising a lever pivotally mounted upon an axle substantially perpendicular to the said floor, a flexible connection, one end of which is connected with a member of the said accelerator system, the other end of which is connected with an appropriate part of one end of the said lever, said flexible connection passing through at least one guide-means rigidly affixed in respect to the floor in the proximity of the said member, the other end of said lever being provided with a shoe-support member mounted substantially perpendicular to the said floor on the said other end of the said lever through the intermediary of a pivotal axle provided therefor.

GEORGE A. RUBISSOW.